(Model.)
J. L. WOODS.
Corn Sheller.
No. 234,831.
Patented Nov. 23, 1880.
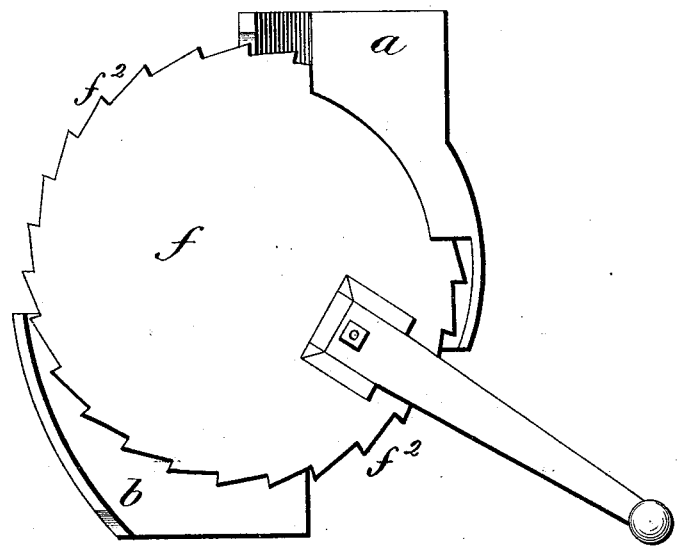
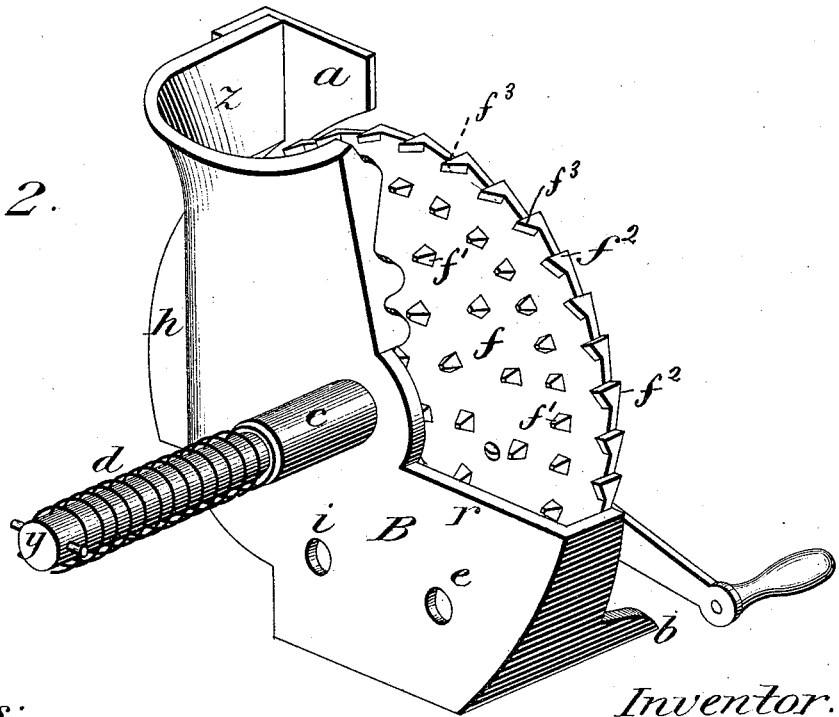
Witnesses:
S. V. Essick
Geo. S. Kelly
Inventor.
James L. Woods

UNITED STATES PATENT OFFICE.

JAMES L. WOODS, OF ALLIANCE, OHIO.

CORN-SHELLER.

SPECIFICATION forming part of Letters Patent No. 234,831, dated November 23, 1880.

Application filed April 5, 1880. (Model.)

*To all whom it may concern:*

Be it known that I, JAMES L. WOODS, of Alliance, in the county of Stark and State of Ohio, have invented a new and useful Improvement in Corn-Shellers, which improvement is fully set forth in the following specification, reference being had to the accompanying drawings.

Figure 1 is a side view, showing the wheel or disk $f$, the shield $a$, and guard $b$. Fig. 2 is a perspective view of the invention, showing all its working parts arranged in order for operation.

$a$ is a shield, the office of which is to prevent the corn from scattering. $b$ is a projecting guard, the office of which is to keep the cob in position until it is carried upward and drops out at $r$. $f$ is a wheel or disk, having projections $f'$ on its inside, in the center of which is the shaft $y$, around which is placed the spring $d$, and which passes through the bearing $c$. The office of the said wheel or disk is to do the principal work of shelling. When an ear is placed within the hopper $z$ with its point downward, and when the said wheel is turned through the use of the crank attached thereto, the hub $c$ is made sufficiently long to hold the said wheel $f$ and shaft $y$ in position.

$d$ is a spiral spring, the office of which is to pull the said disk $f$ in the direction of the main part of the said machine, thereby keeping said disk up to the work while shelling.

$z$ is a hopper, in which the ear of corn is placed preparatory to being shelled.

$i$ and $e$ are holes for screws, by means of which the machine may be fastened to a box, in order that it may be firmly held while in operation.

$h$ is a curved projection of the main part B, which, being of the form of the disk $f$, keeps that portion of the said part $h$ near the said disk, and thus prevents the corn from scattering.

It will be observed that the periphery of the disk or wheel $f$ has saw-tooth-like projections $f^2$, each of which has a triangular tooth projecting inwardly, so as to form, as it were, double saw-teeth, one tooth lying in the plane of the disk and the other projecting inwardly at right angles thereto, as shown at $f^3$. By this peculiar construction of the outer teeth the cob, as it is fed to the machine, is drawn down between the shelling-teeth $f'$, and is prevented from binding between the hopper and the face of the disk by flattening the cob, as is sometimes the case in machines of this class; hence

I claim as my improvement and desire to secure by Letters Patent of the United States—

In a corn-shelling machine, the combination, with the hopper $z$, of a circular shelling-disk, $f$, provided with the inner shelling-teeth, $f'$, and outer peripherical saw-teeth, $f^2$, having inwardly-projecting triangular teeth $f^3$, as and for the purpose set forth.

JAMES L. WOODS.

Witnesses:
S. V. ESSICK,
J. S. BROWN.